US012734385B2

(12) United States Patent
Huang

(10) Patent No.: US 12,734,385 B2
(45) Date of Patent: Sep. 15, 2026

(54) ELECTRICAL FIRE PREVENTION AND DETECTION SYSTEM AND METHOD

(71) Applicant: Industrial Safety and Health Association of the R.O.C, Taipei City (TW)

(72) Inventor: Chien-Ping Huang, Taipei City (TW)

(73) Assignee: Industrial Safety and Health Association of the R.O.C, Taipei City (TW)

( * ) Notice: Subject to any disclaimer, the term of this patent is extended or adjusted under 35 U.S.C. 154(b) by 210 days.

(21) Appl. No.: 18/747,112

(22) Filed: Jun. 18, 2024

(65) Prior Publication Data

US 2025/0325857 A1 Oct. 23, 2025

(30) Foreign Application Priority Data

Apr. 22, 2024 (TW) ................................ 113114975

(51) Int. Cl.
*A62C 37/36* (2006.01)

(52) U.S. Cl.
CPC .................................... *A62C 37/04* (2013.01)

(58) Field of Classification Search
CPC ...... A62C 37/04; G08B 17/125; G06V 20/50; H04N 23/11
See application file for complete search history.

(56) References Cited

U.S. PATENT DOCUMENTS

2013/0050453 A1* 2/2013 Bergstrom ............ G01J 5/0275 348/61

FOREIGN PATENT DOCUMENTS

| | | | | | |
|---|---|---|---|---|---|
| CN | 108335454 A | * | 7/2018 | ........... | G08B 17/125 |
| CN | 114065790 A | | 2/2022 | | |
| CN | 115908407 A | | 4/2023 | | |
| CN | 117387775 A | | 1/2024 | | |
| KR | 20190081712 A | * | 7/2019 | ............ | G08B 17/06 |
| TW | 200417938 A | | 9/2004 | | |
| TW | 202016516 A | | 5/2020 | | |
| WO | 2020196191 A1 | | 10/2020 | | |

* cited by examiner

*Primary Examiner* — Steven M Sutherland

(57) ABSTRACT

Provided are an electrical fire prevention and detection system and method. The electrical fire prevention and detection system includes an image acquisition device and a cloud server. The image acquisition device is configured to acquire a plurality of images of an electrical device in operation. The electrical device in operation includes a plurality of operation blocks, and each of the plurality of operation blocks includes a plurality of electrical components. The cloud server is coupled to the image acquisition device and configured to identify an abnormal electrical component and position in the plurality of images and provide an assessment report of the abnormal electrical component. Thereby, the disclosure prevents human and financial losses caused by failures of electrical components, reduces the occurrence of industrial safety events, avoids industrial manufacturing disturbances and improves operating efficiency.

8 Claims, 2 Drawing Sheets

ELECTRICAL FIRE PREVENTION AND DETECTION SYSTEM AND METHOD

FIELD OF THE INVENTION

The disclosure relates to fire prevention and detection technology, and particularly to an electrical fire prevention and detection system and method.

BACKGROUND OF THE INVENTION

Industrial safety incidents mostly occur with electromechanical equipment or chemicals as a medium, which is often preceded in many cases by a temperature abnormality. Therefore, when an abnormal temperature rise or temperature drop occurs, if the possible chain effect can be eliminated in advance, the occurrence of related industrial safety events can be better controlled. However, for large and complex electromechanical equipment, single-point measurement by contact is not suitable for its management, maintenance, and abnormal operation state prediction. As a result, how to effectively establish an industrial safety field detection mechanism is an important problem to be solved in the art.

SUMMARY OF THE INVENTION

The disclosure provides an electrical fire prevention and detection system and method, which can effectively establish an industrial safety field detection mechanism and prevent human and financial losses caused by failures of electrical components, reduce the occurrence of industrial safety events, avoid industrial manufacturing disturbances and improve operating efficiency.

The electrical fire prevention and detection system provided by the disclosure includes an image acquisition device and a cloud server. The image acquisition device is configured to acquire a plurality of images of an electrical device in operation. The electrical device in operation includes a plurality of operation blocks, and each of the plurality of operation blocks includes a plurality of electrical components. The cloud server is coupled to the image acquisition device and configured to identify an abnormal electrical component and position in the plurality of images and provide an assessment report of the abnormal electrical component.

In an embodiment of the present invention, the image acquisition device includes an imaging module and an infrared thermal imaging module. The image acquisition device acquires a first image by means of the imaging module and a second image by means of the infrared thermal imaging module, and the plurality of images includes the first image and the second image.

In an embodiment of the present invention, the image acquisition device distinguishes the plurality of operation blocks and identifies the plurality of electrical components in the first image by means of image identification, acquires temperature values of the plurality of electrical components in the second image by means of image identification, and identifies the abnormal electrical component according to the plurality of operation blocks, the plurality of electrical components and the temperature values of the plurality of electrical components.

In an embodiment of the present invention, the image acquisition device acquires images of the abnormal electrical component again by means of the imaging module and the infrared thermal imaging module. The plurality of images includes the images of the abnormal electrical component.

In an embodiment of the present invention, the cloud server analyzes the cause of abnormality of the abnormal electrical component and the position thereof and performs a risk assessment according to the component abnormality determination criteria to generate the assessment report of the abnormal electrical component.

In an embodiment of the present invention, the assessment report of the abnormal electrical component includes an improvement level scheme and an improvement scheme.

The electrical fire prevention and detection method provided by the disclosure is applied to an electrical fire prevention and detection system including an image acquisition device and a cloud server coupled to the image acquisition device. The electrical fire prevention and detection method includes: acquiring, by means of the image acquisition device, a plurality of images of an electrical device in operation, the electrical device in operation including a plurality of operation blocks, and each of the plurality of operation blocks including a plurality of electrical components; and identifying, by means of the cloud server, an abnormal electrical component and position in the plurality of images and providing an assessment report of the abnormal electrical component.

In an embodiment of the present invention, the acquiring, by means of the image acquisition device, the plurality of images of the electrical device in operation further includes: acquiring, by means of the imaging module, a first image; and acquiring, by means of the infrared thermal imaging module, a second image. The plurality of images includes the first image and the second image.

In an embodiment of the present invention, the acquiring, by means of the image acquisition device, the plurality of images of the electrical device in operation further includes: distinguishing the plurality of operation blocks and identifying the plurality of electrical components in the first image by means of image identification; acquiring temperature values of the plurality of electrical components in the second image by means of image identification; and identifying the abnormal electrical component according to the plurality of operation blocks, the plurality of electrical components and the temperature values of the plurality of electrical components.

In an embodiment of the present invention, the acquiring, by means of the image acquisition device, the plurality of images of the electrical device in operation further includes: acquiring images of the abnormal electrical component again by means of the imaging module and the infrared thermal imaging module. The plurality of images includes the images of the abnormal electrical component.

In an embodiment of the present invention, the identifying, by means of the cloud server, the abnormal electrical component and position in the plurality of images and providing the assessment report of the abnormal electrical component includes: analyzing the cause of abnormality of the abnormal electrical component and a position thereof and performing a risk assessment according to component the abnormality determination criteria to generate the assessment report of the abnormal electrical component.

In an embodiment of the present invention, the assessment report of the abnormal electrical component includes an improvement level scheme and an improvement scheme.

The imaging module and the infrared thermal imaging module can detect the abnormal electrical component, and the cloud server can identify the abnormal electrical component and position and provide the assessment report, so the disclosure can prevent human and financial losses caused by failures of electrical components, reduce the occurrence of industrial safety events, avoid industrial manufacturing disturbances, and improve operating efficiency.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF PREFERRED EMBODIMENTS

Figure 1:
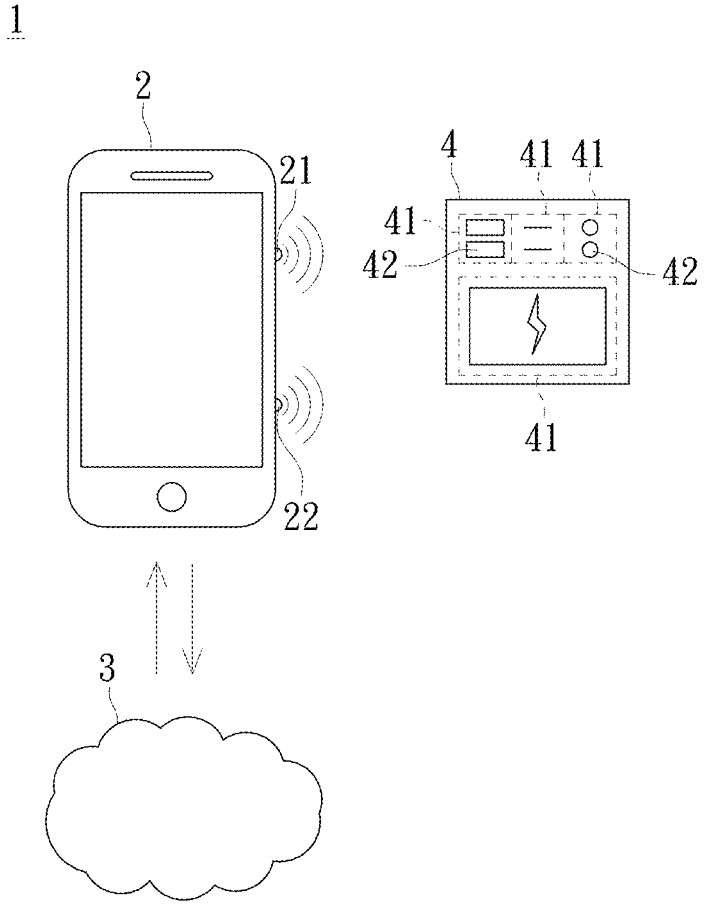
FIG. 1 is a schematic diagram of an electrical fire prevention and detection system according to an embodiment of the present invention.

The disclosure is described particularly by the following examples, and these examples are for illustrative purposes only. For those skilled in the art, various changes and modifications can be made without departing from the spirit and scope of the disclosure, so the scope of protection of the disclosure shall be as defined in the appended claims. Throughout the specification and claims, unless the context clearly specifies otherwise, the meaning of "a" and "the" includes that such statements include "one or at least one" component or element. In addition, as used herein, the singular article also includes the statement of a plurality of components or elements unless it is apparent from the specific context that the plurality is excluded. Moreover, when applied in this description and all the claims below, the meaning of "in" may include "in" and "on" unless the context clearly specifies otherwise. Unless otherwise specified, the terms used throughout the specification and claims usually have the ordinary meaning of each term used in the art, in the contents disclosed here, and in special contents. Some terms used to describe the disclosure will be discussed below or elsewhere in this specification to provide the practitioner with additional guidance on the description of the disclosure. The use of examples anywhere throughout this specification, including examples of any term discussed here, is for illustrative purposes only and certainly does not limit the scope and meaning of the disclosure or any exemplary term. Similarly, the disclosure is not limited to the examples set forth in this specification.

In addition, if the word "coupled" or "connected" is used herein, it includes any direct and indirect electrical connection means. For example, if the first device is electrically coupled to the second device, it means that the first device may be directly connected to the second device, or indirectly connected to the second device through other devices or connecting means. In addition, if the transmission and provision of electrical signals are described, those skilled in the art should understand that the transmission process of electrical signals may be accompanied by attenuation or other non-ideal changes, but the source of transmission or provision and the receiving end of the electrical signal shall be substantially regarded as the same signal unless otherwise specified. For example, if a terminal A of an electronic circuit transmits (or provides) an electrical signal S to a terminal B of the electronic circuit, the electrical signal may go through the source and drain terminals of the transistor switch and/or the possible stray capacitance, causing a voltage drop. However, the purpose of this design is not to deliberately use the attenuation or other non-ideal changes generated during transmission (or provision) to achieve some specific technical effects and the electrical signal S should be regarded as substantially the same signal at the terminal A and the terminal B of the electronic circuit.

It can be understood that the terms "comprising", "including", "having", "containing", "involving" and so on as used herein are open-ended, which means including but not limited to. In addition, it is not necessary for any embodiment or claim of the disclosure to achieve all the objectives, advantages, or characteristics disclosed in the disclosure. In addition, the ABSTRACT section and title are merely intended to assist in searching patent documents and are not intended to limit the claims of the disclosure.

FIG. 1 is a schematic diagram of an electrical fire prevention and detection system according to an embodiment of the present invention. The electrical fire prevention and detection system 1 provided by this embodiment includes an image acquisition device 2 and a cloud server 3. The cloud server 3 is coupled to the image acquisition device 2. In addition, the electrical fire prevention and detection system 1 provided by this embodiment may be applied to various industrial electrical fields. Before the implementation of the electrical fire prevention and detection system 1, a detection worker receives a distribution plan of the industrial electrical field provided by the cloud server 3 in advance to detect the electrical devices 4 in sequence. While the detection worker uses the image acquisition device 2 to detect the electrical devices 4, the image acquisition device 2 may record and store data corresponding to the electrical devices 4 according to the sequence of the electrical devices 4. In this embodiment, the image acquisition device 2 includes an imaging module 21 and an infrared thermal imaging module 22 and is configured to acquire a plurality of images of electrical devices 4 in operation. The image acquisition device 2 is an electronic device with a computing function, such as a smart phone. The electrical device 4 is an industrial electrical device, such as a distribution box. The electrical device 4 includes a plurality of operation blocks 41. Each operation block 41 includes a plurality of electrical components 42. The operation blocks 41 are industrial electronic circuits, such as power supply circuits and distribution circuits. The electrical components 42 are electronic devices through which current can flow, such as switches and cables. In other embodiments, the image acquisition device 2 is, for example, a smart phone, and includes an infrared thermal imaging device connected to the outside. In this embodiment, the cloud server 3 is configured to identify an abnormal electrical component 42 and the position thereof in the images and provide an assessment report of the abnormal electrical component 42.

Specifically, the image acquisition device 2 acquires a first image by means of the imaging module 21 to distinguish the plurality of operation blocks 41 and identifies the plurality of electrical components 42 in the first image by means of image identification, acquires a second image by means of the infrared thermal imaging module 22 to acquire the temperature values of the plurality of electrical components 42 in the second image by means of image identification, identifies the abnormal electrical component 42 according to the plurality of operation blocks 41, the plurality of electrical components 42, and the temperature values of the plurality of electrical components 42, and acquires the image of the abnormal electrical component 42 again by means of the imaging module 21 and the infrared thermal imaging module 22. The plurality of images includes the first image, the second image, and the images of the abnormal electrical component 42. After receiving the plurality of images, the cloud server 3 analyzes a cause of abnormality and the position of the abnormal electrical component 42 and performs a risk assessment according to the component abnormality determination criteria to generate the assessment report of the abnormal electrical component 42. It can be noted that the image identification is to collect the target data by the edge operation to accelerate the data processing. In detail, after receiving the plurality of images, the cloud server 3 analyzes the plurality of images to obtain common images, thermal images, and temperature data files, analyzes the temperatures of the electrical components 42 in the images by means of an artificial intelligence identification unit to find the electrical component 42 with abnormal temperature in the images and mark the position or frame out the range of the electrical component 42 with abnormal temperature in the images, and then determines the cause of abnormality such as life expired or failures according to the electrical component 42 with abnormal temperature, and finally produces the assessment report, including an improvement level scheme, such as "take notice", "improve within a time limit" or "improve immediately", and an improvement scheme, such as "replacement or maintenance is recommended", "re-locking or crimping is recommended" or "it is recommended to clean the disk surface", according to the component abnormality determination criteria, such as IEC, SPIE, SEMI, ISA, NFPA, IEEE, ANSI and CNS.

Figure 2:
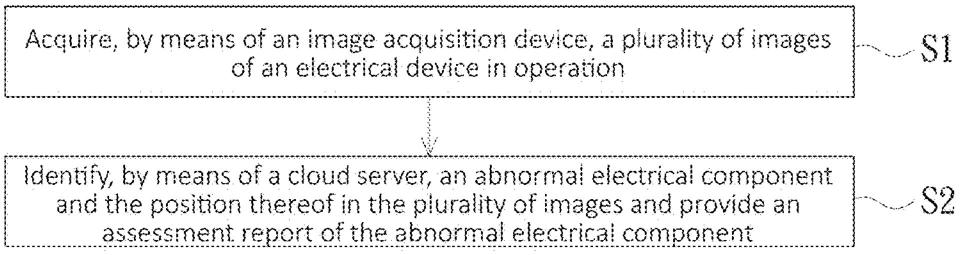
FIG. 2 is a flowchart of an electrical fire prevention and detection method according to an embodiment of the present invention.

FIG. 2 is a flowchart of an electrical fire prevention and detection method according to an embodiment of the present invention. The electrical fire prevention and detection method provided by this embodiment includes steps as follows. Step S1: acquire, by means of an image acquisition device 2, a plurality of images of an electrical device 4 in operation, wherein the electrical device 4 in operation includes a plurality of operation blocks 41, and each of the operation blocks 41 includes a plurality of electrical components 42. Step S3: identify, by means of a cloud server 3, an abnormal electrical component 42 and a position thereof in the plurality of images and provide an assessment report of the abnormal electrical component 42. The functions performed by the image acquisition device 2 and the cloud server 3 in this embodiment are as described in the corresponding paragraphs in the above example, and no redundant detail is to be given herein.

Figure 3:
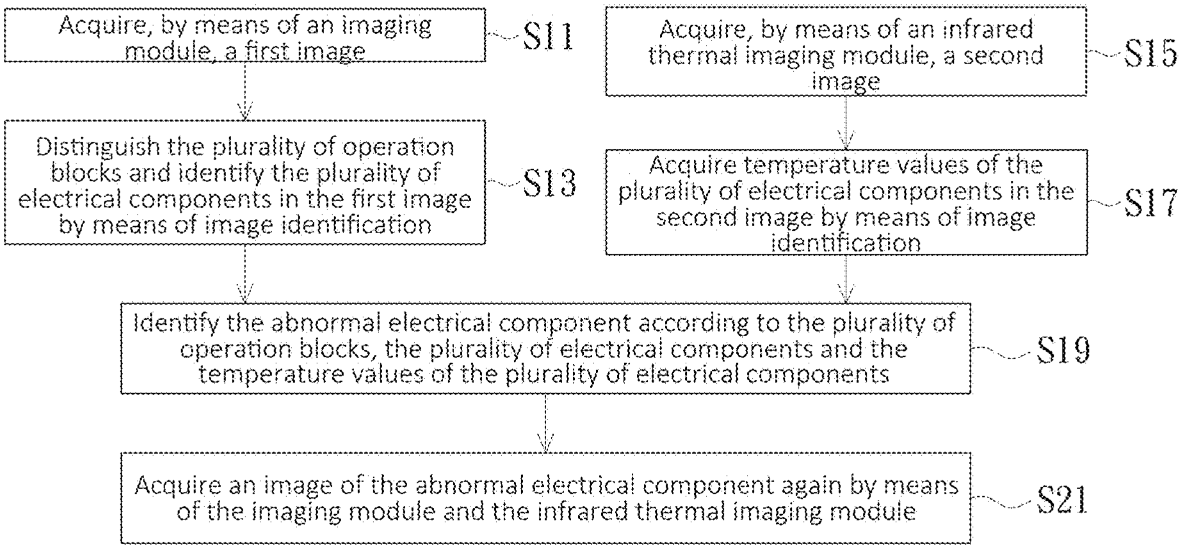
FIG. 3 is a flowchart of acquiring images of an electrical device in operation according to an embodiment of the present invention.

FIG. 3 is a flowchart of acquiring images of the electrical device in operation according to an embodiment of the present invention. Step S1 provided by this embodiment includes steps as follows. Step S11: acquire, by means of an imaging module 21, a first image. Step S13: distinguish the plurality of operation blocks 41 and identify the plurality of electrical components 42 in the first image by means of image identification. Step S15: acquire, by means of an infrared thermal imaging module 22, a second image. Step S17: acquire temperature values of the plurality of electrical components 42 in the second image by means of image identification. Step S19: identify the abnormal electrical component 42 according to the plurality of operation blocks 41, the plurality of electrical components 42, and the temperature values of the plurality of electrical components 42. Step S21: acquire an image of the abnormal electrical component 42 again by means of the imaging module 21 and the infrared thermal imaging module 22. In detail, when an abnormality, such as high temperature or relatively high temperature, occurs in the electrical component 42, the image acquisition device 2 will guide the photographer to photograph the abnormal electrical component again. The functions performed by the image acquisition device 2, the imaging module 21 and the infrared thermal imaging module 22 in this embodiment are as described in the corresponding paragraphs in the above example, and no redundant detail is to be given herein.

Figure 4:
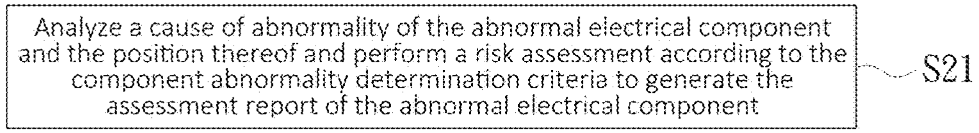
FIG. 4 is a flowchart of identifying an abnormal electrical component and position in the images and providing an assessment report according to an embodiment of the present invention.

FIG. 4 is a flowchart of identifying the abnormal electrical component and position in the images and providing the assessment report according to an embodiment of the present invention. Step S3 provided by this embodiment includes steps as follows. Step S31: analyze a cause of abnormality of the abnormal electrical component and position and perform a risk assessment according to the component abnormality determination criteria to generate the assessment report of the abnormal electrical component. The functions performed by the cloud server 3 in this embodiment are as described in the corresponding paragraphs in the above example, and no redundant detail is to be given herein.

Finally, the assessment report generated by the cloud server 3 may be displayed by an electronic device of a relevant organization, such as a computer, so that the detection worker and expert can review it.

Based on the above, according to the electrical fire prevention and detection system and method provided by the disclosure, the imaging module and the infrared thermal imaging module can detect the abnormal electrical component, and the cloud server can identify the abnormal electrical component and position and provide the assessment report, so the disclosure can prevent human and financial losses caused by failures of electrical components, reduce the occurrence of industrial safety events, avoid industrial manufacturing disturbances and improve operating efficiency.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical fire prevention and detection system, comprising:
   - an image acquisition device, configured to acquire a plurality of images of an electrical device in operation, wherein the electrical device in operation comprises a plurality of operation blocks, and each of the operation blocks comprises a plurality of electrical components; and
   - a cloud server, coupled to the image acquisition device and configured to identify an abnormal electrical component and a position thereof in the images and provide an assessment report of the abnormal electrical component;

wherein the image acquisition device comprises an imaging module and an infrared thermal imaging module, the image acquisition device acquires a first image by the imaging module and a second image by the infrared thermal imaging module, and the images comprise the first image and the second image;

wherein the image acquisition device distinguishes the operation blocks and identifies the electrical components in the first image by image identification, acquires temperature values of the electrical components in the second image by image identification and identifies the abnormal electrical component according to the operation blocks, the electrical components, and the temperature values of the electrical components.

2. The electrical fire prevention and detection system according to claim 1, wherein the image acquisition device acquires an image of the abnormal electrical component again by the imaging module and the infrared thermal imaging module, and the images comprise the image of the abnormal electrical component.

3. The electrical fire prevention and detection system according to claim 1, wherein the cloud server analyzes a cause of abnormality and the position of the abnormal electrical component and performs a risk assessment based on a component abnormality determination criteria to generate the assessment report of the abnormal electrical component.

4. The electrical fire prevention and detection system according to claim 3, wherein the assessment report of the abnormal electrical component comprises an improvement level scheme and an improvement scheme.

5. An electrical fire prevention and detection method, applied to an electrical fire prevention and detection system comprising an image acquisition device and a cloud server coupled to the image acquisition device, the electrical fire prevention and detection method comprising:

acquiring, by the image acquisition device, a plurality of images of an electrical device in operation, wherein the electrical device in operation comprises a plurality of operation blocks, and each of the operation blocks comprises a plurality of electrical components; and identifying, by the cloud server, an abnormal electrical component and a position thereof in the images and providing an assessment report of the abnormal electrical component;

wherein the image acquisition device comprises an imaging module and an infrared thermal imaging module, and the acquiring, by the image acquisition device, the images of the electrical device in operation comprising:

acquiring, by the imaging module, a first image; and acquiring, by the infrared thermal imaging module, a second image;

wherein the images comprise the first image and the second image;

wherein the acquiring, by the image acquisition device, the images of the electrical device in operation further comprises:

distinguishing the operation blocks and identifying the electrical components in the first image by image identification;

acquiring temperature values of the electrical components in the second image by image identification; and identifying the abnormal electrical component according to the operation blocks, the electrical components, and the temperature values of electrical components.

6. The electrical fire prevention and detection method according to claim 5, wherein the acquiring, by the image acquisition device, the images of the electrical device in operation further comprises:

acquiring an image of the abnormal electrical component again by the imaging module and the infrared thermal imaging module;

wherein the images comprise the image of the abnormal electrical component.

7. The electrical fire prevention and detection method according to claim 5, wherein the identifying, by the cloud server, the abnormal electrical component and a position thereof in the images and providing the assessment report of the abnormal electrical component comprises:

analyzing a cause of abnormality of the abnormal electrical component and a position thereof and performing a risk assessment according to a component abnormality determination criteria to generate the assessment report of the abnormal electrical component.

8. The electrical fire prevention and detection method according to claim 7, wherein the assessment report of the abnormal electrical component comprises an improvement level scheme and an improvement scheme.

* * * * *